United States Patent Office 2,815,815
Patented Dec. 10, 1957

2,815,815

METHOD OF CONTROLLING LOOSE SAND

Wayne F. Hower and John A. Knox, Duncan, Okla., assignors to Halliburton Oil Well Cementing Company, Duncan, Okla.

No Drawing. Application December 8, 1955,
Serial No. 551,960

1 Claim. (Cl. 166—20)

This invention relates to improved and novel methods directed to the consolidation and control of loose sands in a formation traversed by a bore hole.

There are many oil producing sands that are not properly consolidated with the result that varying quantities of sand are produced with the oil. In many instances, loose sand fills the bore hole necessitating frequent and expensive clean out jobs. In some cases the well has to be abandoned due to the inability to consolidate the sand in the formation successfully.

Various methods and apparatuses have been used in attempts to prevent the loose sand from leaving the formation. Unless some preventative measures are taken the loose sand either is produced along with the oil or enters and fills the well bore. Some of the methods heretofore employed are: gravel packing, wetting the unconsolidated sand with a binding resin, use of filter materials, cementing with preservation of interstices, packing the formation with resin coated ground walnut shells, and the use of mechanical filters and screens. These methods have met with varying degrees of success. The methods of the present invention are proposed to solve this problem, especially where prior methods have not proven to be successful.

It is an object of the present invention to control and consolidate the loose sands in a producing formation.

It is another object of this invention to control and consolidate any zone or formation traversed by a bore hole.

One method of practicing the present invention is to coat closely graded sand with a thermosetting resin, which has been treated with a curing agent. This treated sand is mixed in a carrying agent and pumped into the loose formation. The treated sand is of a particle size greater than the average particle size of the formation sand. The treated sand when pumped into the formation packs into a hard and permeable mass adjacent to the bore hole and prevents the migration of the formation sand. The carrying agent goes into the formation, but the resin treated sand screens out and packs between the loose formation and the well bore. The resin cements the sand particles together in a permeable mass, while the interstices between the grains are preserved. Compressive strengths of over 5,000 p. s. i. and permeabilities of over 10 darcies result.

A specific embodiment of the present invention is as follows: 3,000 pounds of Ottawa sand, which passes a 20 mesh screen and remains on a 40 mesh screen is mixed with an oil carrier in the ratio of 1 to 3 pounds of sand per gallon of oil. The mixture is pumped into the formation to be consolidated. This is followed by 1,000 pounds of the same sand coated with approximately 100 pounds of an epoxy liquid resin. An epoxy resin known as Epon 828 manufactured by the Shell Chemical Corporation has been found to produce successful results in this specific embodiment. The epoxy resin has been mixed with 7.6 pounds of diethylene triamine, a curing agent. The resin coated sand is mixed with a carrying oil in the same ratio of 1 to 3 pounds per gallon and pumped into the formation. The preferred embodiment is to follow with enough oil to flush all the sand into the formation. If resin treated sand is left in the casing and sets up it can be easily drilled out. Upon setting, the mass has a compressive strength of at least 1,000 p. s. i. to 5,000 p. s. i. and a permeability of over 10 darcies. Sand having more angularity as well as other particle size distribution may be used.

In the above embodiment of this invention the 1,000 pounds of Ottawa sand may be coated with 100 pounds of a polyester liquid resin. A polyester resin known as Laminac 4119 manufactured by the American Cyanamide Company has been found to produce successful results in this embodiment. The polyester resin is mixed with one pound of methyl ethyl ketone peroxide and ⅕ of a pound of a 6% solution of cobalt naphthenate. The substitution of the polyester resin produces substantially the same results as when the epoxy resins are used. However, the polyester resins result in a lower compressive strength.

Of the thermosetting resins the epoxy and the polyester types are preferred but this invention should not be considered limited to them. The epoxy resins have resulting high compressive strengths, have high adhesion to stand, and require less resin.

Some preferred curing agents for the epoxy types of resins are the poly functional primary and secondary amines, such as diethylene triamine, tetraethyl ethylene diamine, hexamethylene triamine, and tetraethylene pentamine.

Other substances that cure epoxies are other amines, acid anhydrides and di-basic acids.

Resins that are curing agents for epoxies are urea formaldehyde, melamine formaldehyde, and polyamides.

Polyester type resins are cured by a combination of organic peroxide and cobalt naphthenate, such as a combination of benzoyl peroxide or methyl ethyl ketone peroxide and cobalt naphthenate.

The above referred to curing agents are also denominated as accelerators in the art.

The preferred carrying medium embodied in the present invention is a hydrocarbon, such as crude oil, diesel oil, or kerosene.

The above described methods and ingredients are described to make the disclosure complete and to illustrate how the invention may be best carried out. It is not the intent that the invention be limited to the above methods and ingredients, as vairous changes may be made without departing from the spirit of the invention or the scope of the annexed claim.

We claim:

A method of treating an oil well or the like producing from a formation having loose sand particles therein, comprising first selecting a quantity of Ottawa sand, the particles of which are of a size greater than the average particle size of the formation sand, mixing said quantity of Ottawa sand with an oil carrier in the ratio of 1 to 3 pounds of sand per gallon of oil and pumping this mixture into the formation of the well to be treated, secondly, selecting a second quantity of Ottawa sand of the same particle size as that of the first quantity, but differing therefrom in that it has been coated with a liquid resin and a curing agent, mixing said second quantity of Ottawa sand with an oil carrier in the ratio of 1 to 3 pounds of sand per gallon of oil and pumping this mixture into the formation of the well to be treated so as to follow the placing of the uncoated sand therein, thereby creating in the formation a screen of resin treated Ottawa sand between the loose sand in the formation and the well bore.

References Cited in the file of this patent

UNITED STATES PATENTS

| | | |
|---|---|---|
| 2,506,486 | Bender et al. | May 2, 1950 |
| 2,556,169 | Crouch et al. | June 12, 1951 |
| 2,573,690 | Cardwell et al. | Nov. 6, 1951 |